(12) United States Patent
Wang et al.

(10) Patent No.: US 9,248,414 B2
(45) Date of Patent: Feb. 2, 2016

(54) LARGE PORE POLYMERIC MEMBRANE

(75) Inventors: I-Fan Wang, San Diego, CA (US); Amarnauth Singh, Selden, NY (US)

(73) Assignee: Pall Corporation, Port Washington, NY (US)

(*) Notice: Subject to any disclaimer, the term of this patent is extended or adjusted under 35 U.S.C. 154(b) by 852 days.

(21) Appl. No.: 13/435,386

(22) Filed: Mar. 30, 2012

(65) Prior Publication Data
US 2013/0256229 A1 Oct. 3, 2013

(51) Int. Cl.
| | |
|---|---|
| *B01D 67/00* | (2006.01) |
| *B01D 69/02* | (2006.01) |
| *B01D 71/52* | (2006.01) |
| *B01D 71/68* | (2006.01) |
| *B01D 71/78* | (2006.01) |
| *B01D 71/28* | (2006.01) |
| *B01D 69/12* | (2006.01) |
| *B01D 69/10* | (2006.01) |

(52) U.S. Cl.
CPC .......... *B01D 71/78* (2013.01); *B01D 67/0016* (2013.01); *B01D 67/0018* (2013.01); *B01D 67/0013* (2013.01); *B01D 69/02* (2013.01); *B01D 71/28* (2013.01); *B01D 71/52* (2013.01); *B01D 2323/06* (2013.01); *B01D 2323/08* (2013.01); *B01D 2325/02* (2013.01); *B01D 2325/022* (2013.01); *B01D 2325/08* (2013.01); *Y10T 428/24998* (2015.04)

(58) Field of Classification Search
CPC ........... B01D 67/0016; B01D 67/0018; B01D 69/02; B01D 2325/08; B01D 71/52; B01D 71/78; B01D 2325/02; B01D 71/28; B01D 69/12; B01D 69/10; B01D 71/68; Y10T 428/24998
USPC ......... 210/650, 500.41; 427/385.5; 428/315.9
See application file for complete search history.

(56) References Cited

U.S. PATENT DOCUMENTS

| | | | |
|---|---|---|---|
| 4,629,563 A * | 12/1986 | Wrasidlo | ............ 210/500.34 |
| 4,659,470 A | 4/1987 | Caneba et al. | |
| 4,774,039 A | 9/1988 | Wrasidlo | |
| 5,444,097 A | 8/1995 | Tkacik | |
| 5,834,107 A | 11/1998 | Wang et al. | |
| 5,869,174 A | 2/1999 | Wang | |
| 5,906,742 A * | 5/1999 | Wang et al. | ............ 210/500.41 |

(Continued)

FOREIGN PATENT DOCUMENTS

| | | |
|---|---|---|
| CN | 1213339 A | 4/1999 |
| CN | 1254308 A | 5/2000 |

(Continued)

OTHER PUBLICATIONS

Examination Report, Australian Application No. 2013201107, dated Oct. 4, 2013.

(Continued)

*Primary Examiner* — Krishnan S Menon
*Assistant Examiner* — Liam Royce
(74) *Attorney, Agent, or Firm* — Leydig, Voit & Mayer

(57) ABSTRACT

Porous membranes including a first microporous skin surface having a pore density of at least about 20 pores/50,000 $\mu m^2$, and a second porous surface, and a bulk between the surfaces, wherein the bulk has a pore density of at least about 120 pores/$mm^2$, as well as methods of using and methods of making the membranes are disclosed.

6 Claims, 5 Drawing Sheets

X-SEC      FIRST (SKIN) SIDE      SECOND SIDE

X800 100 μm

X800 100 μm

X800 100 μm

(56) References Cited

U.S. PATENT DOCUMENTS

| | | |
|---|---|---|
| 5,979,670 A | 11/1999 | Ditter et al. |
| 6,056,529 A | 5/2000 | Meyering et al. |
| 6,110,369 A | 8/2000 | Ditter et al. |
| 6,790,404 B2 | 9/2004 | Yapel et al. |
| 6,994,811 B2 | 2/2006 | Kools |
| 7,125,493 B2 | 10/2006 | Wang et al. |
| 7,208,200 B2 | 4/2007 | Kools |
| 7,560,025 B2 | 7/2009 | Kools |
| 7,842,214 B2 | 11/2010 | Romdhane et al. |
| 2002/0162792 A1 | 11/2002 | Zepf |
| 2004/0145073 A1* | 7/2004 | Wang ............... B01D 19/0031 264/41 |
| 2005/0011834 A1 | 1/2005 | Wang et al. |
| 2007/0026219 A1* | 2/2007 | Petersen et al. ............ 428/316.6 |
| 2008/0197072 A1 | 8/2008 | Ansorge et al. |
| 2010/0294713 A1 | 11/2010 | Tsuzawa et al. |

FOREIGN PATENT DOCUMENTS

| | | |
|---|---|---|
| CN | 100 337 730 C | 9/2007 |
| CN | 100 402 135 C | 7/2008 |
| EP | 0 578 210 A2 | 1/1994 |
| EP | 1 038 570 A1 | 9/2000 |
| JP | 60-41503 A2 | 3/1985 |
| JP | 1994-166116 A | 6/1994 |
| JP | 2000-505719 A | 5/2000 |
| JP | 2001-505818 A | 5/2001 |
| JP | 2001-515396 | 9/2001 |
| JP | 2004-41835 A2 | 2/2004 |
| WO | WO 95/23640 A1 | 9/1995 |
| WO | WO 96/40421 A1 | 12/1996 |
| WO | WO 98/25758 A1 | 6/1998 |
| WO | WO 01/89673 A2 | 11/2001 |

OTHER PUBLICATIONS

Notice of Reasons for Rejection, Japanese Application No. P2013-072231 dated May 13, 2014.
Notice of Reasons for Rejection, Korean Application No. 10-2013-0032450, dated May 29, 2014.
Office Action, Chinese Application No. 201310101025.6 dated Oct. 30, 2014.
European Patent Office, Extended European Search Report in EP Patent Application 13 15 4574 (Jul. 22, 2013).
International Search Report, Singapore Application No. 201301098-8, dated Sep. 12, 2013.

* cited by examiner

LARGE PORE POLYMERIC MEMBRANE

BACKGROUND OF THE INVENTION

Synthetic polymer membranes are used for filtration in a variety of applications. However, there is a need for membranes that provide sufficient strength and sufficient retention of undesirable material while providing good throughput. There is also a need for membranes for inkjet applications that minimize smearing.

The invention provides such membranes.

These and other advantages of the present invention will be apparent from the description as set forth below.

BRIEF SUMMARY OF THE INVENTION

An embodiment of the invention provides a porous polymeric membrane comprising a first microporous skin surface; a second porous surface; and, a bulk between the first microporous skin surface and the second porous surface, wherein the bulk of the membrane has a pore density of at least about 120 pores/mm$^2$. Preferably, the first microporous skin surface comprises a pore density of at least about 20 pores/50,000 micrometers$^2$ (µm$^2$). In some embodiments, the first microporous skin surface comprises a mean pore size of at least about 10 µm. Alternatively, or additionally, in some embodiments, the bulk of the membrane has a mean flow pore (MFP) size of at least about 15 µm.

In some embodiments, the membrane comprises an isotropic membrane comprising a first microporous skin surface, the first microporous skin surface comprising a pore density of at least about 20 pores/50,000 µm$^2$; a second porous surface, wherein the second porous surface comprises a second microporous skin surface; and, a bulk between the first microporous skin surface and the second porous surface, wherein the bulk of the membrane has a pore density of at least about 120 pores/mm$^2$. In other embodiments, the membrane comprises an asymmetric membrane comprising a first microporous skin surface, the first surface having a pore density of at least about 20 pores/50,000 µm$^2$; a second porous surface; and, a bulk between the first microporous skin surface and the second porous surface, the bulk of the membrane having a pore density of at least about 120 pores/mm$^2$, wherein the second porous surface comprises a second coarse porous surface, wherein the second coarse porous surface comprises pores having a mean pore size that is greater than the mean pore size of the pores in the first microporous skin surface. Typically, the second coarse porous surface comprises pores having a mean pore size that is at least about 1.3 times the mean pore size of the pores in the first microporous skin surface.

In a typical embodiment, the bulk of the asymmetric or the isotropic membrane has an MFP size of at least about 15 µm. Alternatively, or additionally, in a typical embodiment, the first microporous skin surface of the asymmetric or the isotropic membrane has a mean pore size of at least about 10 µm.

In another embodiment, a method for making porous polymeric membranes is provided, the method comprising casting a polymer solution on a support, exposing the cast solution to a temperature of at least about 95° F. for at least about 40 seconds; inducing thermal phase inversion of the solution to form a pre-membrane; and, quenching the pre-membrane.

In other embodiments, methods of using the membranes and devices including the membranes are provided.

BRIEF DESCRIPTION OF THE SEVERAL VIEWS OF THE DRAWING(S)

DETAILED DESCRIPTION OF THE INVENTION

Figure 1:
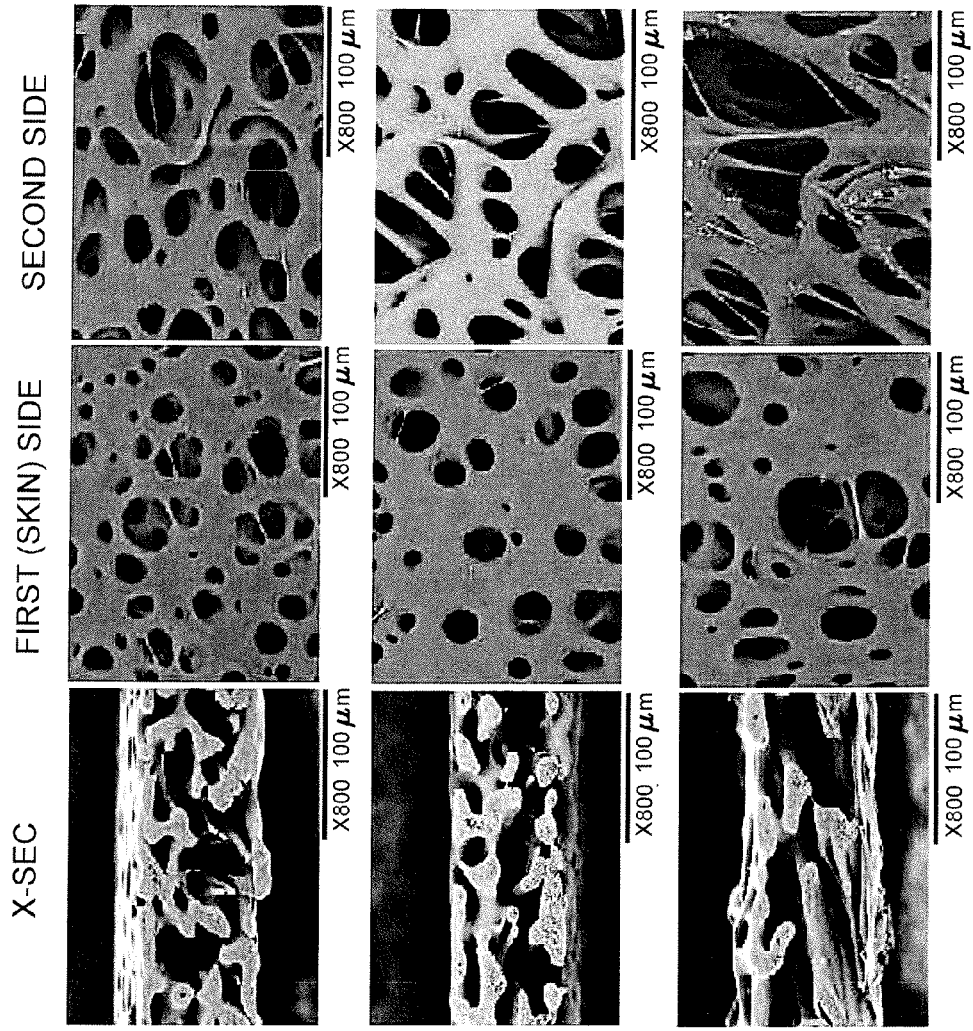
FIG. 1A-1C show cross-sectional, microporous skin surface, and coarse porous surface views of several asymmetric membranes according to embodiments of the present invention.

An embodiment of the invention provides a porous polymeric membrane comprising a first microporous skin surface; a second porous surface; and, a bulk between the first microporous skin surface and the second porous surface, wherein the bulk has a pore density of at least about 120 pores/mm$^2$. Preferably, the first microporous skin surface comprises a pore density of at least about 20 pores/50,000 µm$^2$. In a preferred embodiment, the first microporous skin surface comprises a mean pore size of at least about 10 µm. Alternatively, or additionally, in a typical embodiment, the bulk of the membrane has a mean flow pore (MFP) size of at least about 15 µm.

In some embodiments, the membrane comprises an isotropic membrane comprising a first microporous skin surface, the first microporous skin surface comprising a pore density of at least about 20 pores/50,000 µm$^2$; a second porous surface, wherein the second porous surface comprises a second microporous skin surface; and, a bulk between the first microporous skin surface and the second porous surface, wherein the bulk of the membrane has a pore density of at least about 120 pores/mm$^2$. In a typical embodiment, the bulk of the isotropic membrane has an MFP size of at least about 15 µm, and in a preferred embodiment, the first microporous skin surface has a mean flow pore size of at least about 10 µm.

In other embodiments, the membrane comprises an asymmetric membrane comprising a first microporous skin surface, the surface having a pore density of at least about 20 pores/50,000 µm$^2$; a second porous surface; and, a bulk between the first microporous skin surface and the second porous surface, the bulk of the membrane having a pore density of at least about 120 pores/mm$^2$, wherein the second porous surface comprises a second coarse porous surface, wherein the second coarse porous surface comprises pores having a mean pore size that is greater than the mean pore size of the pores in the first microporous skin surface. Typically, the second coarse porous surface comprises pores having a mean pore size that is at least about 1.3 times the mean pore size of the pores in the first microporous skin surface. In some embodiments, the second coarse porous surface comprises pores having a mean pore size that is at least about 1.5 times the mean pore size of the pores in the first microporous skin surface, for example, the second coarse porous surface can comprises pores having a mean pore size that is that is in the range of from about 5 times to about 15 times the mean pore size of the pores in the first microporous skin surface. In a typical embodiment, the bulk of the asymmetric membrane has an MFP size of at least about 15 μm.

Typically, the polymeric membrane comprises a sulfone membrane, preferably, a sulfone membrane, more preferably, a polyethersulfone membrane.

Another embodiment of the invention comprises a method for processing a fluid, the method comprising passing the fluid through an embodiment of the membrane.

In yet another embodiment, a method for making a porous membrane is provided, the method comprising casting a polymer solution on a support, exposing the cast solution to a temperature of at least about 95° F. (preferably, at least about 100° F.) for at least about 40 seconds; inducing thermal phase inversion of the solution to form a pre-membrane; and, quenching the pre-membrane, preferably in a water bath, more preferably a heated water bath, to provide a set membrane. The set membrane can be separated from the support and leached to remove the solvent and other soluble ingredients (alternatively, the set membrane can be removed from the support before or during leaching). The separated membrane can be dried, or kept wet.

Advantageously, the inventive membranes are particularly suitable for inkjet applications, providing minimal smearing and/or gel line. An additional advantage is that they provide sufficient strength and sufficient retention of undesirable material while providing good throughput (flow rate).

Accordingly, in one embodiment of a method according to the invention, the method comprises filtering an ink-containing fluid by passing it through an embodiment of the membrane.

In other embodiments, devices including the membranes are provided. For example, in one embodiment, a device comprises a filter capsule for ink jet filtration, the capsule comprising a housing having an inlet and an outlet and defining a fluid flow path between the inlet and the outlet, and a filter comprising an embodiment of the membrane between the inlet and the outlet and across the fluid flow path. Optionally, the device comprises an opaque housing to protect against UV-light intrusion.

Membranes according to embodiments of the invention can be used in a variety of applications, including, for example, inkjet applications, diagnostic applications (including, for example, sample preparation and/or diagnostic lateral flow devices), filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry, filtering fluids for the food and beverage industry, clarification, filtering antibody- and/or protein-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

As used herein, the term "skin" (in "microporous skin surface") does not indicate the relatively thick, nearly impervious layer of polymer that is present in some membranes. Here, the microporous skin is a relatively thin, porous surface that overlies a microporous region of variable thickness. The pores of the underlying microporous region may be the same size as, or somewhat smaller than, the skin pores. In asymmetric membranes according to the invention, the opposite face of the membrane (the second porous surface) can be referred to as the non-skin face, or the coarse pored surface.

The membranes can have any suitable pore structure, e.g., a pore size (for example, as evidenced by bubble point, or by $K_L$ as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the porous media. The pore structure used depends on the size of the particles to be utilized, the composition of the fluid to be treated, and the desired effluent level of the treated fluid.

Typically, the bulk of the asymmetric and isotropic membranes according to embodiments of the invention have an MFP size of at least about 15 μm, in some embodiments, for example, 17 or 18 μm, and in some embodiments, at least about 20 μm, or greater.

Membranes according to embodiments of the invention have a high pore density in the bulk of the membranes. Pore density can be determined for a given membrane sample by, for example, viewing a scanning electron micrograph of the surface of the membrane of interest of a given square surface area and calculating the number of pores in the given area. The number of pores calculated to be in a given square area can be normalized to a particular reference area through a simple ratio. In contrast with commercially available membranes having pore densities in the bulk of about 8 pores/mm$^2$ or even about 70 pores/mm$^2$, membranes (asymmetric and isotropic) produced in accordance with embodiments of the invention have pore densities in the bulk of at least about 120 pores/mm$^2$, typically, pore densities of at least about 150 pores/mm$^2$, preferably, pore densities of at least about 160 pores/mm$^2$. In some embodiments, membranes according to the invention have pore densities in the bulk of about 200 pores/mm$^2$, or more.

Preferably, the microporous skin surface also has a high pore density (e.g., as determined by SEM surface pore analysis, for example, by calculating from an SEM micrograph at 800× magnification). In contrast with commercially available membranes having skin surface pore densities of about 13 pores/500 μm$^2$, membranes produced in accordance with embodiments of the invention have skin surface pore densities of at least about 20 pores/50,000 μm$^2$, typically, skin surface pore densities of at least about 23 pores/50,000 μm$^2$, preferably, skin surface pore densities of at least about 26 pores/50,000 μm$^2$. In some embodiments wherein the second porous surface is a microporous surface, the second porous surface also has the high pore densities described above.

The porous surfaces of the membranes can have any suitable mean pore size, e.g., as determined by, for example, calculating the average surface pore size from an SEM micrograph at 800× magnification. Typically, at least the first microporous skin surface has a mean pore size of at least about 10 μm. In some embodiments, the first microporous skin surface has a mean pore size of at least about 15 μm, or at least about 20 μm.

Isotropic membranes according to the invention have first and second surfaces comprising microporous skin surfaces wherein the surfaces have mean pore sizes that are substantially the same. For example, the second microporous skin surface can have a mean pore size that is about 1 to about 1.2 times the mean pore size of the pores in the first microporous skin surface.

Asymmetric membranes have a pore structure (e.g., a mean flow pore size) varying throughout the bulk of the membrane. For example, the mean pore size decreases in size from one portion or surface to another portion or surface (e.g., the mean flow pore size decreases from the upstream portion or surface to the downstream portion or surface). However, other types of asymmetry are encompassed by embodiments of the invention, e.g., the pore size goes through a minimum pore size at a position within the thickness of the asymmetric membrane. The asymmetric membrane can have any suitable pore size gradient or ratio. This asymmetry can be measured by, for example, comparing the mean pore size on one major surface of a membrane with the mean pore size of the other major surface of the membrane.

In those embodiments wherein the inventive membrane comprises an asymmetric membrane, the second porous surface comprises pores having a mean pore size that is greater than the mean pore size of the pores in the first microporous skin surface. Typically, the second surface has a mean pore size that is at least about 1.3 times the mean pore size of the first surface. In some embodiments, the mean pore size of the second surface is at least about 1.5 times, or at least about 2 times, the mean pore size of the first surface, for example, in the range of from about 3 to about 15 times the mean pore size of the first surface, or from about 2 to about 10 times the mean pore size of the first surface.

Advantageously, membranes according to the invention provide good throughput (flow rate), typically, at least about 1500 ml/min@4 inches water pressure, preferably, at least about 2000 ml/min@4 inches water pressure.

Alternatively, or additionally, membranes according to the invention have a delta P transmembrane pressure (TMP) of about 150 Pascal (Pa) or less, preferably, about 125 Pa or less. For example, in some embodiments, the TMP is in the range of about 30 to about 100 Pa.

Membranes according to the invention can have a water bubble point of at least about 20 inches of water.

Membranes according to the invention are typically unsupported.

Typically, membranes according to the invention have a thickness in the range of from about 70 µm to about 300 µm, preferably in the range of from about 80 µm to about 150 µm.

Typically, the voids volume of the membrane is at least about 50%, e.g., in the range of from about 60% to about 90%, preferably, in the range of from about 70% to about 85%.

Preferably, the membrane is prepared by a thenually induced phase inversion process. Typically, the phase inversion process involves casting or extruding polymer solution (s) into thin films, and precipitating the polymers through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms the pores.

Thermal phase inversion can be carried out using a variety of techniques and systems. For example, a casting bed, belt, or stone (or moving carrier or support thereon) can be heated using, illustratively, a heating pad, heating lamp, another heated object, a heated fluid circulation system, or a water bath. Typically, thermal phase inversion is carried out using a temperature of at least about 95° F., preferably, at least about 100° F., and in some embodiments, at least about 110° F., for at least about 40 seconds (preferably, at least about 45 seconds), so that phase inversion is completed before quenching.

Typically, a temperature gradient is initially produced in the thickness of the cast solution, such that the side or surface of the cast solution contacting (or facing) the heating lamp or heated casting bed, belt, stone, carrier or support will have a temperature that is different than the opposite side or surface positioned away from the lamp, bed, belt, stone, carrier or support.

Figure 3A:
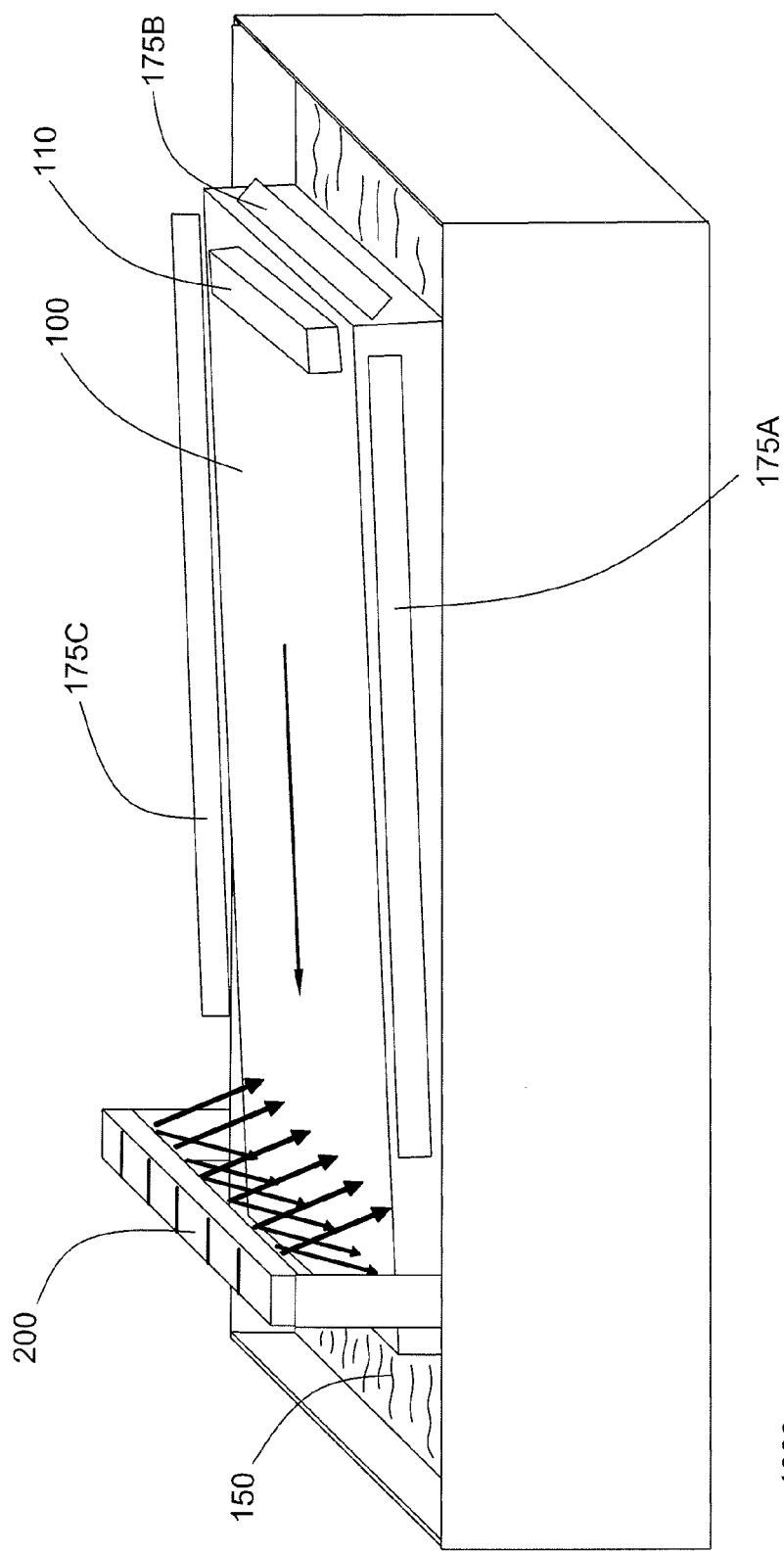
FIGS. 3A-3C show illustrative systems for preparing embodiments of membranes according to the present invention, the illustrated systems including heating belts to heat a stone having a cast solution thereon (FIG. 3A), water baths to heat a stone having a cast solution thereon (FIG. 3B), and a heating lamp to heat the side of the cast solution not contacting the stone (FIG. 3C).
Figure 3B:
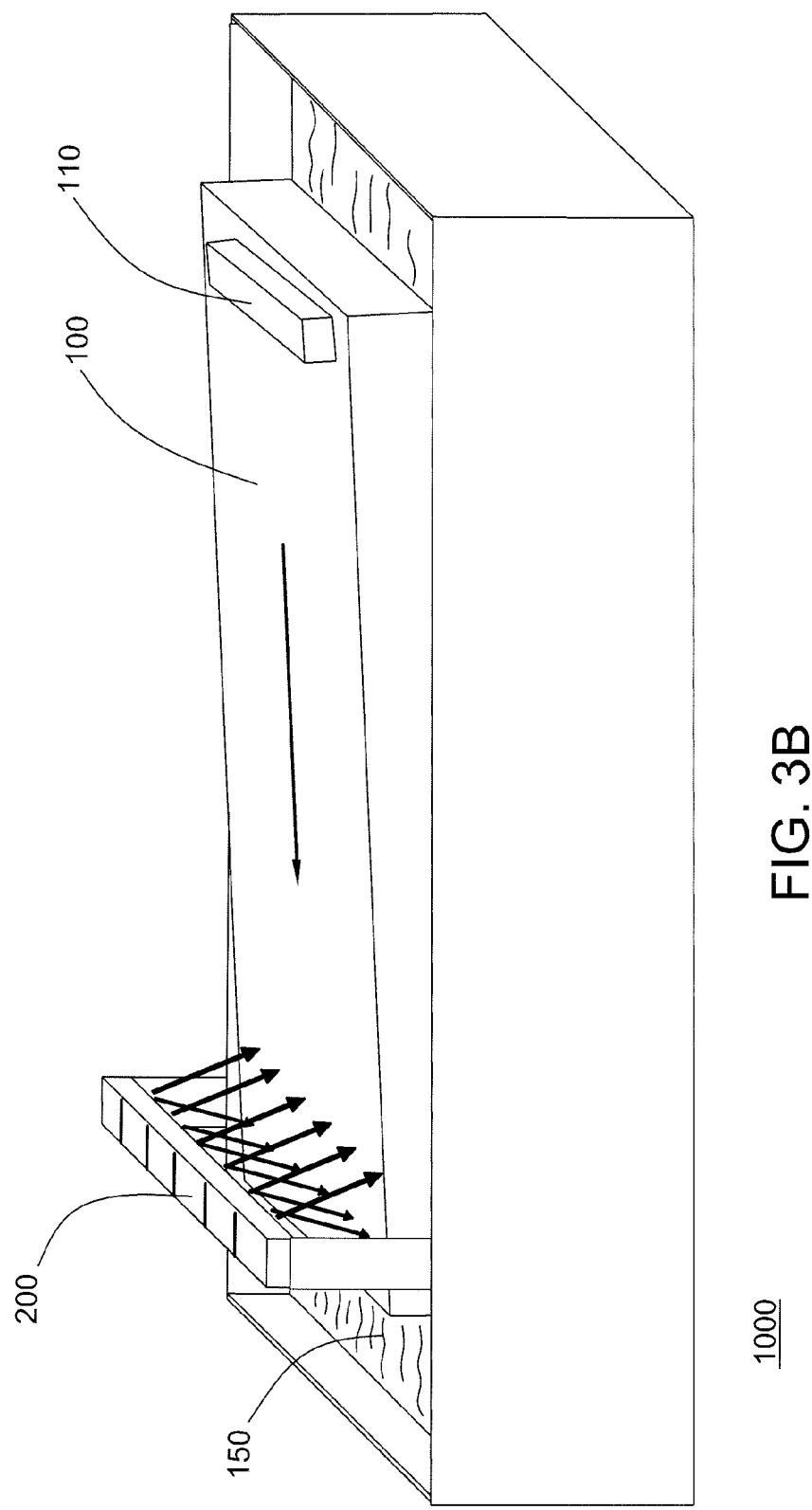
Figure 3C:
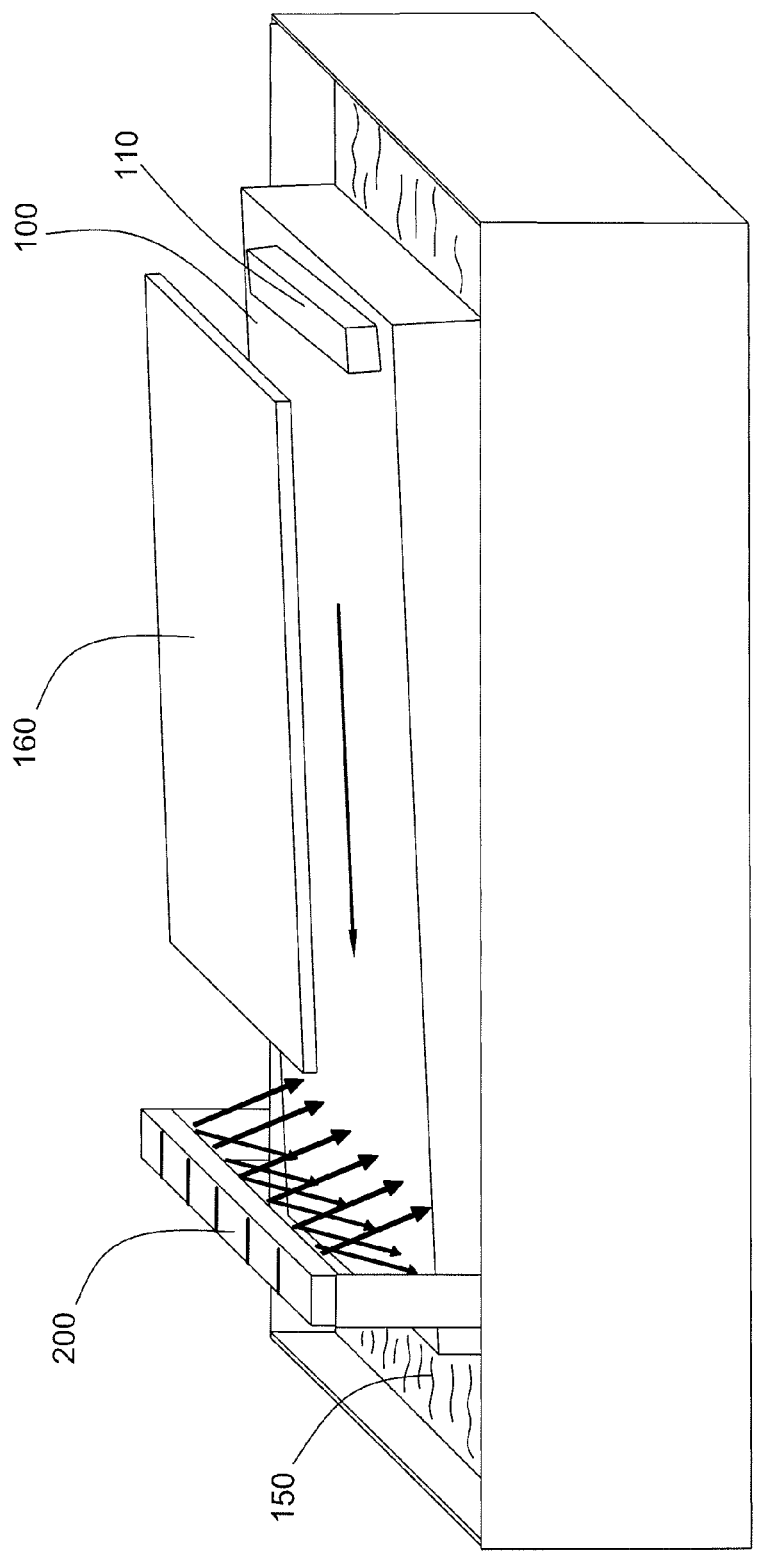

Illustratively, using the exemplary systems 1000 shown in FIGS. 3A-3C for reference, a polymer solution is cast (using knife 110), typically on a moving belt, that moves over a stone 100 (in the casting direction shown by the single arrow on the stone) and into a quenching bath 150 (that may also provide a heating bath for heating the stone). The stone can be heated, e.g., by using at least one heating belt 175 (for example, as shown in FIG. 3A, showing heating belts 175A, 175B, and 175C) or by using a heated water bath (for example, as shown in FIG. 3B), or heat can be applied to the side of the cast solution not contacting the belt or stone (for example, by using a heating lamp 160 as shown in FIG. 3C).

If air velocity is desired, the system can include one or more fans to provide air velocity. FIGS. 3A-3C show six fans 200.

The membranes can be cast manually (e.g., poured, cast, or spread by hand onto a casting surface) or automatically (e.g., poured or otherwise cast onto a moving bed). Examples of suitable supports include, for example, polyethylene coated paper, or polyester (such as MYLAR).

A variety of casting techniques are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 120 micrometers to about 500 micrometers, more typically in the range from about 180 micrometers to about 400 micrometers.

A variety of air gaps are suitable for use in the invention, and the air gaps can be the same for the same for the knives/doctor blades, or different. Typically, the air gaps are in the range of from about 30 inches to about 80 inches, more typically, in the range of from about 35 inches to about 60 inches.

A variety of casting speeds are suitable as is known in the art. Typically, the casting speed is at least about 2 feet per minute (fpm), e.g., with knife air gaps of at least about 3 inches.

A variety of polymer solutions are suitable for use in the invention, and are known in the art. Suitable polymer solutions can include, polymers such as, for example, polyaromatics; sulfones (e.g., polysulfones, including aromatic polysulfones such as, for example, polyethersulfone, polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles (including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); tetramethylurea; dioxane; diethyl succinate; dimethylsulfoxide; chloroform; and tetrachloroethane; and mixtures thereof. Suitable nonsolvents include, for example, water; various polyethylene glycols (PEGS; e.g., PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane)dihydrochloride (V50)), and combinations thereof), and/or minor ingredients such as surfactants and/or release agents.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

In accordance with the invention, the membrane can have a plurality of layers wherein the layers can be formed from the same polymer and solvent, varying the viscosity, additives, and treatment, or different polymers can be used for different layers.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane is hydrophilic, having a CWST of 72 dynes/cm ($72 \times 10^{-5}$ N/cm) or more. In some embodiments, the element has a CWST of 75 dynes/cm (about $75 \times 10^{-5}$ N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van der Graff generator, ultraviolet light, electron beam, or to various other forms of radiation, or by surface etching or deposition using a plasma treatment.

A device comprising at least one membrane according to an embodiment of the invention can include additional elements, layers, or components, that can have different structures and/or functions, e.g., at least one of prefiltration, support, drainage, spacing and cushioning. Illustratively, an embodiment of the device can also include at least one additional element such as a mesh and/or a screen.

In accordance with embodiments of the invention, the membrane can have a variety of configurations, including planar, pleated, and hollow cylindrical.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

The following examples further illustrate the invention but, of course, should not be construed as in any way limiting its scope.

In the following examples, a system is set up as generally shown in FIG. 3B, including knife 110. Six fans are used to provide air velocity. Solutions are cast on a moving MYLAR belt.

EXAMPLE 1

This example demonstrates the preparation of membranes according to embodiments of the invention.

Solutions are cast on a moving MYLAR belt (at a casting speed of 3.5 fpm), using a casting knife having a knife gap of 14.5 mils. The fan speed is 60 watts.

A solution consisting of 11.0% PSF (P-3500), 2.0% DI water, 5.25% PVP (k-90), 19.5% PEG200, and 62.25% NMP is cast. Another solution consisting of 10.9% PSF (P-3500), 2.0% DI water, 5.5% PVP (k-90), 19.3% PEG200, and 62.25% NMP is cast.

Another solution consisting of 10.7% PSF (P-3500), 1.95% DI water, 5.1% PVP (k-90), 21.3% PEG200, and 60.95% NMP is cast.

Following each casting, the belt having the cast solution thereon is passed over a heated stone (heated to a temperature between 100-110° F.) for 55 seconds and then the solution is quenched in a water bath having a temperature of about 130° F.

SEM views (skin surface, coarse surface, and cross-section) of the membranes are shown in FIG. 1A-1C.

The MFPs of the bulks of the membranes, as determined by the Xonics POROMETER, average 20 μm. The membranes exhibit a water flow averaging over 1980 ml/min@4 inches water pressure. The thickness of the membranes averages about 89 μm. The pore density of the membranes, as determined using a Xonics POROMETER, averages over 150 pores/mm$^2$, and the pore density of the microporous skin surfaces as determined by SEM surface pore analysis averages over 25 pores/50,000 μm$^2$. The CWSTs of the membranes averages over 76 dynes/cm ($76 \times 10^{-5}$ N/cm).

In order to show the importance of heat, an asymmetric membrane is also prepared as generally described above (using a solution consisting of 11.0% PSF (P-3500), 2.0% DI water, 5.25% PVP (k-90), 19.5% PEG200, and 62.25% NMP), with the exception that the stone is at ambient temperature, rather than heated. The MFP of the bulk of the membrane, as detetinined by the Xonics POROMETER, is 8.9 µm. The membrane exhibits a water flow of 792 ml/min@4 inches water pressure. The thickness of the membrane is about 110 µm. The pore density of the membrane, as determined using a Xonics POROMETER, is over 150 pores/mm$^2$, and the pore density of the microporous skin surface as determined by SEM surface pore analysis is over 25 pores/50,000 µm$^2$.

EXAMPLE 2

This example demonstrates the preparation of an isotropic membrane according to another embodiment of the invention.

A solution consisting of 11.0% PSF (P-3500), 2.0% DI water, 5.25% PVP (k-90), 19.5% PEG200, and 62.25% NMP is cast on a moving MYLAR belt (at a casting speed of 3.5 fpm), using a casting knife having a knife gap of 14.5 mils. The fan speed is 70 watts (64 feet per minute (fpm)).

Following casting, the belt having the cast solution thereon is passed over a heated stone (between 100-110° F.) for 65 seconds and then the solution is quenched in a water bath having a temperature of about 130° F.

Figure 2:
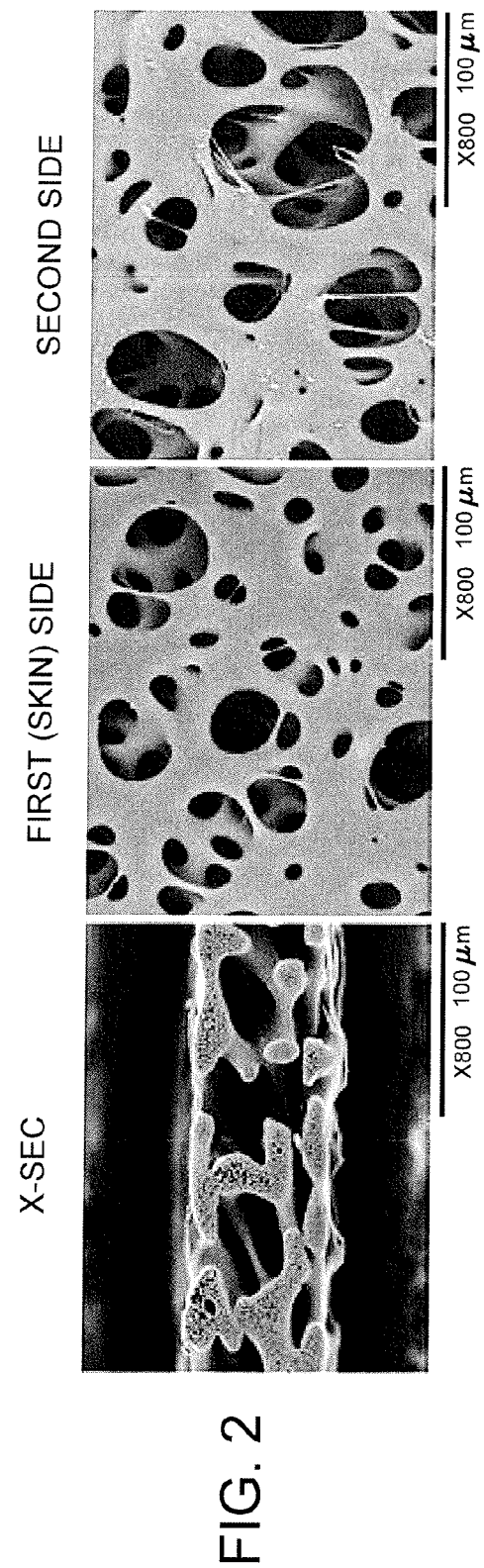
FIG. 2 shows cross-sectional, first microporous surface, and second microporous surface views of an isotropic membrane according to another embodiment of the present invention.

SEM views (first skin surface, second skin surface, and cross-section) of the membrane are shown in FIG. 2. The mean pore size of the pores of the skin surfaces are each 19.5 µm.

The MFP of the bulk of the membrane is 19.8 µm. The water flow is over 1980 ml/min@4 inches water pressure. The pore density of the bulk is over 130 pores/mm$^2$, the membrane has a thickness of 90 µm, a tensile strength of 311 gram force (gF), and a break strength of 28%.

For comparison, an isotropic membrane is prepared as generally described in U.S. Patent Application Publication 2002/0162792 using a solution consisting of 9.0% PSF (P-3500), 2.0% DI water, 4.3% PVP (k-90), 19.5% PEG200, and 65.2% NMP. The MFP of the bulk of the membrane is 15 µm, the water flow is about 800 ml/min@4 inches water pressure, the pore density of the bulk is in the range of about 70-92 pores/mm$^2$, the pore density of the microporous skin surface as determined by SEM surface pore analysis is 13 pores/50,000 µm$^2$, the membrane has a thickness of 112 µm, a tensile strength of 125 gF, and a break strength of 7%.

EXAMPLE 3

This example demonstrates the preparation of asymmetric membranes with different asymmetry ratios according to embodiments of the invention.

Solutions consisting of 11.0% PSF (P-3500), 2.0% DI water, 5.25% PVP (k-90), 19.5% PEG200, and 62.25% NMP are cast on a moving MYLAR belt (at a casting speed of 3.5 fpm), using a casting knife having a knife gap of 14.5 mils. The fan speeds are 70, 80 and 85 watts (64 fpm, 95 fpm, and 104 fpm, respectively). Following each casting, the belt having the cast solution thereon is passed over a heated stone (between 100-110° F.) for 50 seconds and then the solution is quenched in a water bath having a temperature of about 130° F.

The resultant asymmetric membranes have asymmetry ratios of 1.8, 2.5, and 3.7, respectively. The MFPs of the bulks of the membranes are 18.2 µm, 16.6 µm, and 17.4 µm, respectively. The water flows are 1720, 1650, and 1633 ml/min@4 inches water pressure, respectively. The mean pore sizes of the first microporous surfaces are 15 µm, 12.1 µm, and 10 µm, respectively, and the mean pore sizes of the second porous (coarse) surfaces are 27.8 µm, 30 µm, and 37 µm, respectively.

EXAMPLE 4

This example demonstrates the preparation of asymmetric membranes, including asymmetric membranes prepared using temperatures greater than 75° F. according to embodiments of the invention.

Solutions consisting of 11.0% PSF (P-3500), 2.0% DI water, 5.25% PVP (k-90), 19.5% PEG200, and 62.25% NMP are cast on a moving MYLAR belt (at a casting speed of 3.5 fpm), using a casting knife having a knife gap of 14.5 mils. The fan speed is 70 watts. Following each casting, the belt having the cast solution thereon is passed over a heated stone (heated to 75° F., 95° F., and 105° F.) for 50 seconds and then the solution is quenched in a water bath have a temperature of about 130° F.

The membranes prepared using stones heated 75° F., 95° F., and 105° F. have water flows of 810 ml/min@4 inches water pressure, 1630 ml/min@4 inches water pressure, and 2300 ml/min@4 inches water pressure, respectively. The bulks of the membranes have MFP sizes of 8.9 µm, 14 µm, and 20 µm, respectively.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous polymeric membrane comprising an asymmetric membrane comprising:
   (a) a first microporous skin surface, the microporous skin surface comprising a pore density of about 20 pores/50,000 $\mu m^2$ to about 26 pores/50,000 $\mu m^2$ and comprising pores having a mean pore size of at least about 10 $\mu m$;
   (b) a second porous surface, the second porous surface comprising pores having a mean pore size in the range of about 2 to about 10 times the mean size of the pores in the first microporous surface; and,
   (c) a bulk between the first microporous skin surface and the second porous surface wherein the bulk has a pore density of about 120 pores/$mm^2$ to about 200 pores/$mm^2$, and a mean flow pore size (MFP) of at least about 15 $\mu m$ to about 20 $\mu m$.

2. The membrane of claim 1, wherein the polymeric membrane comprises a sulfone membrane.

3. The membrane of claim 2, wherein the polymeric membrane comprises a polyethersulfone membrane.

4. A method for processing a fluid comprising:
   passing the fluid through the membrane of claim 1.

5. A method for making the porous polymeric membrane of claim 1, comprising:
   (a) casting a polymer solution comprising a polymer, a solvent, a non-solvent, and polyvinyl pyrrolidone (PVP), on a moving belt on a stone support heated to a temperature of at least about 95° F.;
   (b) exposing the cast solution to the temperature of at least about 95° F. for at least about 40 seconds while exposing the cast solution to air velocity provided by controlled fan speed;
   (c) inducing thermal phase inversion of the solution to form a pre-membrane; and,
   (d) quenching the pre-membrane.

6. The method of claim 5, wherein the stone support has a temperature of at least about 100° F.

* * * * *